United States Patent [19]

Bramson

[11] Patent Number: 5,321,503
[45] Date of Patent: Jun. 14, 1994

[54] CLOSED LOOP, DEPOLARIZED INTERFEROMETRIC FIBER OPTIC (IFOG) GYROSCOPE WITH SELF ADJUSTING SERRODYNE PHASE NULLING

[75] Inventor: Michael D. Bramson, Ridgecrest, Calif.

[73] Assignee: The United States of America as represented by the Secretary of the Navy, Washington, D.C.

[21] Appl. No.: 534,202

[22] Filed: Jun. 4, 1990

[51] Int. Cl.[5] .............................................. G01C 19/66
[52] U.S. Cl. ...................................................... 356/350
[58] Field of Search .......................................... 356/350

[56] References Cited

U.S. PATENT DOCUMENTS

| | | | |
|---|---|---|---|
| 4,662,751 | 5/1987 | Goss et al. | 356/350 |
| 4,735,506 | 4/1988 | Pavlath | 356/350 |
| 5,018,859 | 5/1991 | Chang et al. | 356/350 |

Primary Examiner—Samuel A. Turner
Assistant Examiner—LaCharles P. Keesee
Attorney, Agent, or Firm—Harvey Gilbert; Melvin Sliwka; John Forrest

[57] ABSTRACT

An interferometric fiber optic gyroscope employing an integrated, width polished, optic chip containing annealed proton exchange waveguides and a Mach-Zehnder interferometer for sensing a ramp induced signal from loop closing electronics to achieve a highly improved gyroscope scale factor linearity and dynamic range. An edge light emitting diode (ELED) operating at $1.3\mu$ wavelength is employed as the light source in the gyroscope. A decorrelator optical fiber segment is employed between the light source and the chip, and a Lyot depolarizer optical fiber segment is employed between the chip and one side of the fiber optic coil. Also, an intermediate output of the loop closing electronics is shown to have reduced scale factor sensitivity to light source wavelength change.

27 Claims, 4 Drawing Sheets

Vs = SYNCHRONOUS DEMODULATOR OUTPUT $$\phi_S = \frac{8\pi A N \Omega}{\lambda C}$$

WHERE
- A = ENCLOSED AREA OF SENSING COIL
- N = NUMBER OF TURNS
- $\Omega$ = INPUT ROTATION RATE
- $\lambda$ = FREE-SPACE WAVELENGTH OF LIGHT SOURCE
- C = FREE-SPACE SPEED OF LIGHT
- $\phi$ = SAGNAC PHASE SHIFT DUE TO ROTATION

CLOSED LOOP, DEPOLARIZED INTERFEROMETRIC FIBER OPTIC (IFOG) GYROSCOPE WITH SELF ADJUSTING SERRODYNE PHASE NULLING

BACKGROUND OF THE INVENTION

1. Field of the Invention

The present invention relates to fiber optic gyroscopes and more particularly to closed loop fiber optic gyroscopes.

2. Description of Related Art

Figure 1:
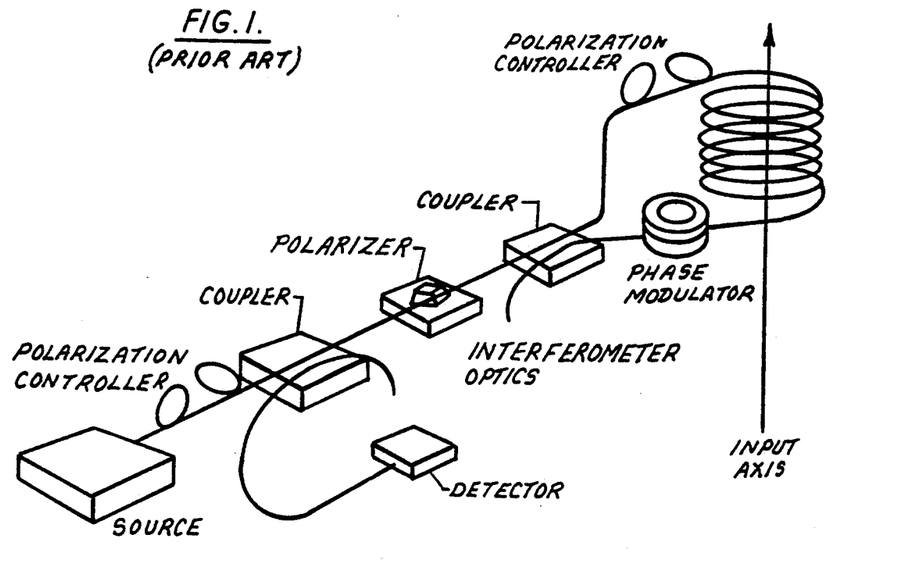
FIG. 1 depicts the arrangement of the components of a prior art interferometric fiber optic gyroscope.
Figure 2:
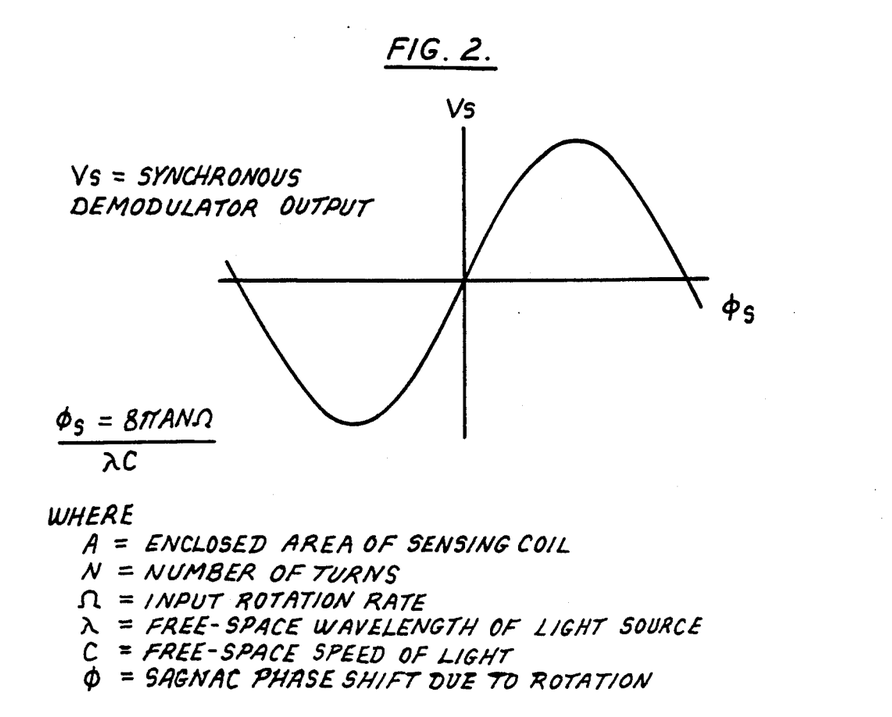
FIG. 2 presents the sinusoidal output of the synchronous demodulator employed in the interferometric fiber optic gyroscope.

The basic configuration of the interferometric fiber optic gyroscope (IFOG) was developed at Stanford University in 1981. The configuration of the basic Stanford interferometric fiber optic gyroscope is depicted in FIG. 1. A light source passes light through the interferometer optics and is split into two beams that propagate around the fiber optic coil of the gyro in opposite directions. The light is then recombined and the resultant intensity at the detector is proportional to the phase difference between the two beams. The phase difference between the two beams is in turn proportional to an input rotation rate about the input axis of the gyro. In the absence of rotation, the interferometer optics insure that both beams traverse the same optical path and thus yield a nominally zero bias for the gyro. In the basic Stanford configuration a phase modulator was constructed of a cylindrical piece of piezo-electric crystal with optical fiber wrapped around it which was placed to one side of the fiber optic sensing coil of the gyro. Applying a sinusoidal voltage to the crystal causes the crystal to expand and contract, thus lengthening and shortening the fiber, which in turn induces phase modulation onto the light traveling through the optical circuit of the gyro. The output of the gyro is then synchronously demodulated at the first harmonic. Synchronous demodulation at the first harmonic transforms the output of the gyroscope from that of a raised cosinusoid to a sinusoidal scale factor. The sinusoidal scale factor is more desirable because of the slope through zero, which is attractive from a controls standpoint, and is anti-symmetric, thereby making it possible to tell the direction that the gyro is rotating. The effect of the synchronous demodulation of the photo diode output is shown in FIG. 2. Thus, in the prior art, Stanford University defined a reciprocal optical circuit and demonstrated the need for waveguide-type optical devices to achieve inertial grade performance. In fact, Stanford University fabricated the entire interferometric fiber optic gyro from a single length of fiber optic waveguide. The Stanford interferometric fiber optic gyroscope is more fully described in the Stanford Report No. 3586 of June 1983 by Ralph Alan Bergh G. L., of Stanford, Calif., incorporated by reference herein.

The Stanford device as well as others of the prior art did not, however, address the additional problems which are now addressed by the present invention. The scale factor of the gyroscope, although superior to the raised cosinusoid, is still sinusoidal. A linear scale factor is highly desirable. Thus, the Stanford gyro did not provide the most desirable end result. Further, the Stanford gyro output is a simple analog dc voltage whereas a digital output is preferred. The fiber optic components used in the prior art interferometric fiber optic gyro are mechanically unstable and impractical in a hostile environment, as configured in the prior art devices.

SUMMARY OF THE INVENTION

Thus, it is an object of the present invention to provide an environmentally stable optical system of components configured as an interferometric fiber optic gyroscope.

It is yet another object of the present invention to provide a closed loop system using a Serrodyne technique (simulating a single sideband frequency shifter via a phase ramp) that will provide a linearized scale factor for the gyro.

It is still another object of the present invention to provide a digital readout scheme without using analog-to-digital converters that limit the dynamic range of the device.

The present invention employs an integrated optical chip which has waveguides, couplers, and phase modulators imbedded in it. The chip is employed between the input fiber optic coupler and the fiber optic coil of the gyroscope. The integration of the optical components on the chip and their placement is specifically related to the solution of the problem associated with environmentally induced instability seen in configurations of the prior art.

The present invention uses a simple analog control loop for nulling the gyro. Closing the loop on the gyro involves inducing a phase equal in magnitude and opposite in sign with respect to the Sagnac phase (phase induced by rotation), into the gyro. This is accomplished with a ramp voltage applied to a phase modulator on one side of the sensing coil. The ramp generator receives a dc voltage proportional to gyro rate from an integrator which receives as its input the output of a synchronous demodulator in the control loop. The phase ramp is transformed into an optical frequency shift (Serrodyne technique) and this frequency difference between the two beams entering the coil causes an accumulated differential phase over the loop transit interval proportional to the ramp slope. Since the ramp generator is part of a servo loop, the slope will automatically adjust to null the gyro. This assumes, however, that the phase amplitude of the ramp is held constant.

The ramp amplitude is held constant by monitoring the phase induced by the Serrodyne ramp and controlling the reset level relative to the starting level. The reset level is controlled to be $2\pi$ radians different from the starting level. The phase monitoring function is accomplished by a Mach-Zehnder interferometer (MZI) on the integrated optical chip, deriving inputs from the chip waveguides connected to the fiber optic coil. These inputs are physically placed between the phase modulator responsible for the Serrodyne function and the phase modulator responsible for phase modulating the gyro. The Serrodyne ramps cause the MZI fringe pattern to shift. Each complete fringe shift is by definition equal to $2\pi$ of induced phase. A photo detector module is used to transform the optical fringe intensity shift into an electrical voltage and a comparator circuit is used to detect a complete cycle of voltage change. When a complete cycle is detected, the comparator triggers the ramp to reset. Additionally, it can be shown mathematically, that each fringe shift is related to a fixed progression of arc. Therefore, each fringe shift is counted electronically and this count becomes the positional output of the gyro. The value of each count or scale factor is given by $$SF = \frac{N_f \lambda}{D}$$

where
$N_f$ = index of refraction of the fiber
$\lambda$ = centroid wavelength of the light source
D = mean diameter of the sensing coil Furthermore, it can be shown mathematically that the rate output of the closed loop gyro of the present invention, which is the instantaneous input level to the Serrodyne ramp generator, is an order of magnitude less sensitive to wavelength change. For low accuracy applications requiring a rate sensor, this output of the present invention can be used without having to perform scale factor wavelength correction and, thus, a less expensive gyro may be fabricated.

In the prior art, the Mach-Zehnder interferometer has been used but has been implemented as a direct circuit from the optical coupler which feeds both sides of the gyroscope fiber optic coil via tap couplers. In the present invention the fiber optic coil is a direct circuit to the coupler feeding both sides of the coil with two separate tap couplers feeding the Mach-Zehnder interferometer. In the presence of a temperature gradient across the chip used in the prior art gyroscopes, each of the tap couplers would differentially change the polarization characteristics of the light entering the coil and produce a temperature dependent bias uncertainty. The present invention configuration uses only one coupler to feed the coil. Thus, both beams must have identical polarization evolution.

The integrated optical chip is angle polished in the width dimension to reduce back reflections at the interface between the chip and the optical fibers, including the Lyot depolarizer with which it interfaces, and the erroneous rotation signals produced thereby. The width dimension angle polishing can also destroy the coherence from any residual back reflections at the interface between two outer waveguides on the chip and the fiber sections to which the fiber optic coil is attached, since this lateral displacement $L_S$ can be made to be greater than the ELED coherence length $L_c$. To accomplish this, the physical separation between the two outer waveguides on the chip must be adjusted according to the known coherence properties of the ELED, since the angle of the polish is fixed for optimum back reflection reduction. For proper back reflection reduction, it is imperative that the optical fiber be angle polished, as well, at its optimum angle.

Standard single mode optical fibers are used for the sensing coil rather than polarization maintaining fibers to make the gyroscope of the present invention physically simple and less costly. One less critical alignment is required when single mode fiber is used in lieu of polarization maintaining fiber and the standard fiber is less expensive than the polarization maintaining fiber.

The present invention has been shown to perform best with a broadband light source with the low envelope mode structure. Thus, an ELED operating at 1.3 microns has been found to perform more satisfactorily than the previously used superluminescent diodes, which display considerable envelope mode structure. The result is that the present invention has a lower Rayleigh noise factor than it would with the superluminescent diode. The ELED also has a longer life. Further, at the 1.3μ wavelength, photo refractive damage of the optical chip does not occur. Therefore, as ELED technology advances toward higher output power levels, the new devices can be used without fear of damaging the chip. Higher power levels improve signal-to-noise performance.

Additional objects, advantages, and benefits of the present invention will be more easily understood when the following detailed description is read in conjunction with the accompanying drawings.

DETAILED DESCRIPTION OF THE INVENTION

For purposes of understanding the present invention, the basic interferometric fiber optic gyroscope of the prior art, employing discrete optical elements, is shown in FIG. 1. The employment of discrete elements is one of the contributing factors to the deficiencies of the devices of the prior art. Environmental impact is of particular significance. Additionally, it should be noted that there is an absence of an external nulling circuit. The device of FIG. 1 does, however, include a phase modulator which induces phase modulation onto the light traveling through the gyroscope. The output of this basic gyroscope configuration can then be synchronously demodulated. This transforms the output of the basic gyroscope from the usual characteristic raised cosinusoid to a sinusoidal scale factor as depicted in FIG. 2.

Figure 3:
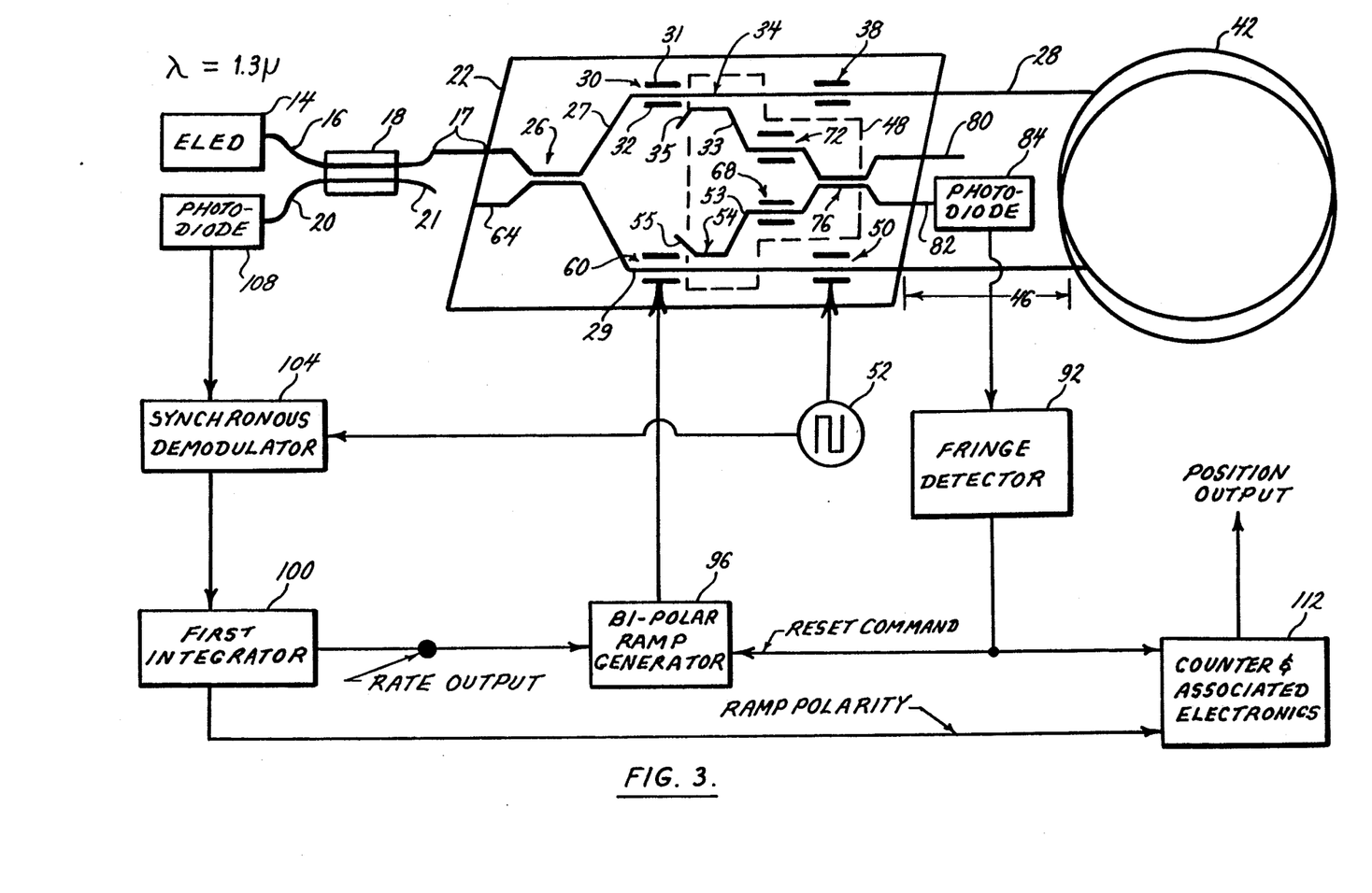
FIG. 3 is a schematic block representation of the subject invention.
Figure 4:
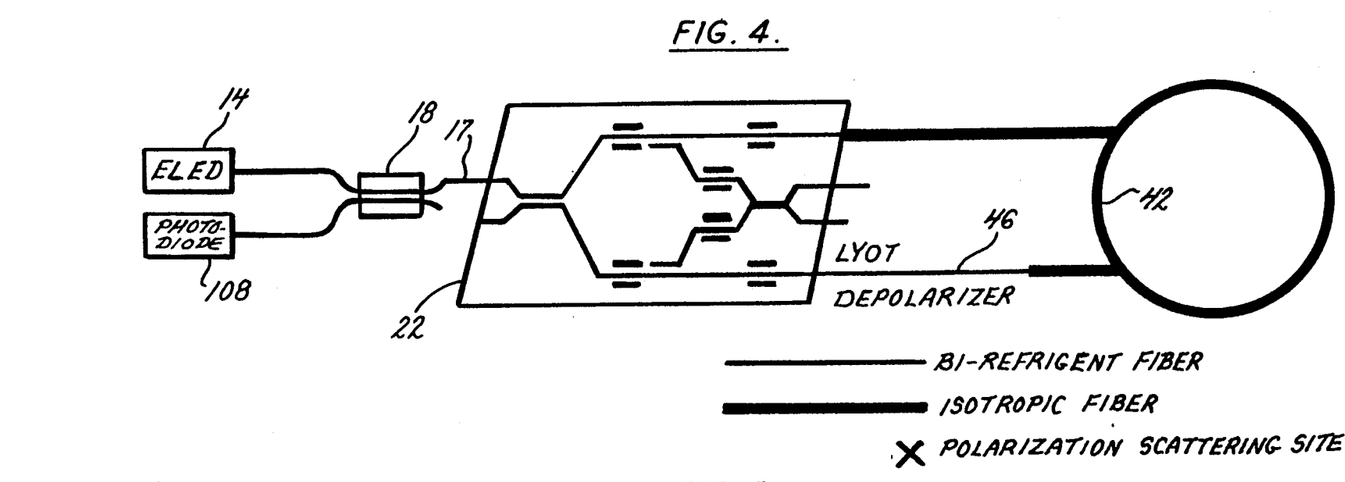
FIG. 4 is a schematic representation of the depolarizing feature of the present invention.

With reference to FIG. 3 the edge light emitting diode (ELED) 14 is connected by means of the fiber optic waveguide segment 16 to the optical coupler 18. The coupler 18 is in turn connected to the integrated optic chip 22 by means of the fiber optic waveguide segment 17 emerging from the coupler 18. Fiber optic waveguide segment 17 constitutes the decorrelator, as depicted more explicitly in FIG. 4. Two polarization states, in general, propagate around the entire gyro optical circuit. As a convention, the two states may be called state A, the state which is preferred by the integrated optic chip, and state B, the state which is extinguished by the chip. Since the depolarizer scatters light into all possible states, it can be assumed that half the light in state B is scattered into state A in the sensing coil. This situation constitutes an error mechanism known as bias uncertainty described by E. C. Kintner in his article, "Fiber Optic Rotation Sensors", Volume 32, page 78, Springer Series in Optical Science. Using the Kintner equation, modified for the case where half the light in B is scattered into A in the coil, the 3σ bias uncertainty is calculated to be $$3\sigma \Omega_u = \frac{\epsilon}{S}$$

where
3σ = 3 times the standard deviation of the bias uncertainty ($\Omega_u$)
ε = polarization extinction ratio of the chip
S = geometric scale factor of the gyro scope
$\Omega_u$ = bias uncertainty (output of gyro)
The geometric scale factor S of the gyro is described in FIG. 2, as the equation for Sagnac phase without the term Ω.

The bias uncertainty equation, in the above form is applicable only if the light in state A is coherent with the light in state B. If the light in state A can be decorrelated from the light in state B, the bias uncertainty term can be reduced by the residual achievable polarization factor of the decorrelator or $$3\sigma \Omega_u = \frac{\epsilon}{S} P$$

where
P = residual polarization factor

The decorrelator is fabricated by attaching a section of polarization preserving single mode fiber (PPSMF) (i.e., the bi-refringent fiber) to the integrated optic chip with one of the axes of the PPSMF aligned to the principal axis of the chip. The input fiber optic coupler is attached to the other end of the PPSMF section. The amount of residual polarization that can be achieved with this configuration decorrelator approaches 0.001 and is described in further detail in the article by Konrad Böhm, Klaus Peterman, and Edgar Weidel, J. of Lightwave Technology, Vol. Lt. 1, No. 1, March 1983.

Figure 5:
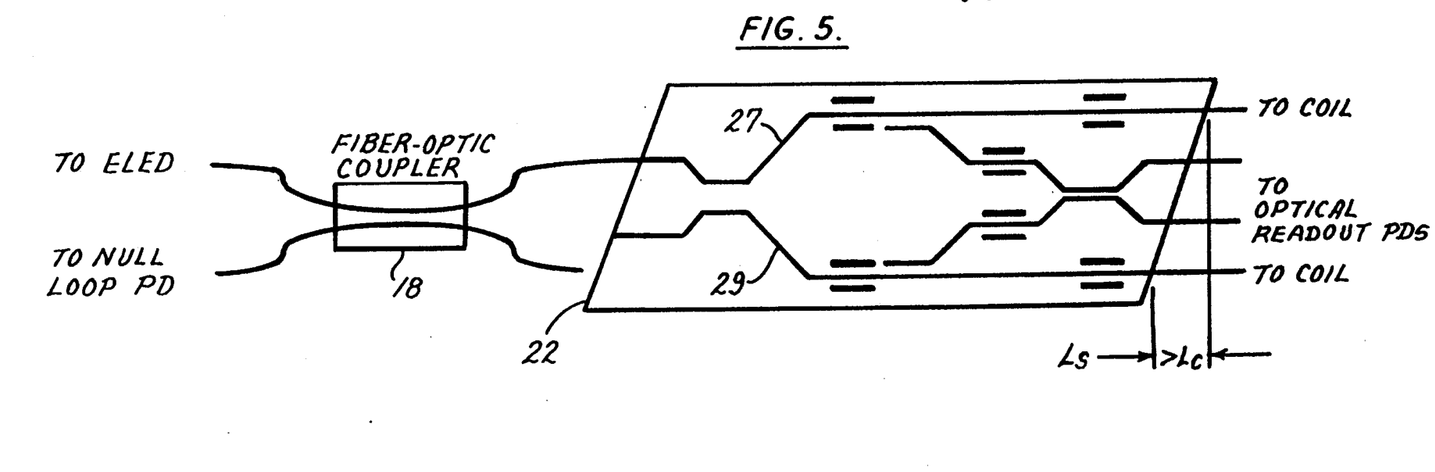
FIG. 5 is a schematic representation of the optical chip of the present invention depicting chip/fiber interface lateral separation $L_S$.

The fiber optic waveguide segment 20 connects the optical coupler 18 with the photodiode 108. This portion of the circuit will be discussed hereinafter. It should be noted here that the fiber optic waveguide segment extending out from the coupler 18 becomes the dead end 21 of this branch of the optical circuit. Within the integrated optic chip 22 the external fiber optic waveguide segment 17 constituting the decorrelator transitions into the imbedded waveguide 27 which continues on through the chip 22 until it interfaces at the end of the chip facing the optical fiber coil 42 by means of the fiber optic waveguide segment 28 which is part of the optical fiber that becomes the coil 42. Likewise, extending across the surface of the chip bearing the waveguide 27 is the imbedded optic waveguide 29 which begins at the dead end 64 on the end of the chip 22 nearest the ELED 14. The imbedded waveguide 29 extends through the chip 22 until it reaches the end of the chip facing the coil 42, at which time it is joined with the Lyot depolarizer 46 shown in FIG. 4 which connects from the waveguide 29 at the end of chip 22 and joins it with the coil 42. The lateral displacement $L_S$ in FIG. 5 between the interfaces of fiber optic waveguides 28 and 46 and imbedded waveguides 27 and 29 respectively, is a result of the width angle polishing of chip 22. This displacement destroys the coherence from any residual back reflections from the interfaces of fiber optic waveguides 28 and 46 and the two outer imbedded waveguides 27 and 29. The angle polishing itself is intended to reduce back reflections at the chip 22 and optical fiber interfaces. The waveguides 27 and 29 in the surface of the chip 22 nearest the ELED 14 are brought close together to form the imbedded optic coupler 26 and then separate as they travel across chip 22 in the direction of the coil 42. Waveguide 27 passes between two metalized pads, 31 and 32, respectively, to create the phase modulator 30. Waveguide 27 then continues on between two similar metal pads to form the phase modulator 38 on its way to the fiber optic waveguide segment 28 connecting to the coil 42. Phase modulators 30 and 38 have no connections to external electrical circuits. They were included on chip 22 for physical symmetry responsive to environmental influences and future applications such as push-pull modulation. Likewise, from the dead end 64 on the ELED 14 end of the chip 22 the imbedded waveguide 29 passes between two planar, rectangular-shaped metalized pads, similar to pads 31 and 32, in order to create phase modulator 60 and thereafter phase modulator 50 before transitioning at the end of chip 22 facing the coil 42 and connecting with the Lyot depolarizer segment 46, as shown in FIG. 4. The function of the Lyot depolarizer 46 is to depolarize the light in the fiber optic sensing coil 42. This is necessary since standard single mode fiber (SSMF) is being used for the sensing coil. To understand this, consider the case where no depolarizer is used.

SSMF is isotropic and prefers no specific polarization state. In contrast, the chip imbedded waveguides are polarizing and not only produce polarized light going into the coil 42, but will only accept light in the same polarization state. Since the SSMF coil has no mechanism for preserving polarization states, it will, in general, change the polarization state of the light exiting the chip 22. This process will be driven by environmental changes, and under certain conditions, the light entering the chip 22 from the coil 42 will be in the polarization state that the chip 22 extinguishes and the signal is then lost.

Conversely, if the Lyot depolarizer 46 is used, thus scattering the light into all possible polarization states, it is guaranteed that half of the light would be in the correct state to be accepted by the chip 22. Therefore, the problem of signal loss is eliminated.

The Lyot depolarizer 46 is constructed by attaching a section of bi-refringent or polarization preserving single mode fiber (PPSMF) to the integrated optic chip 22 with the axes of the PPSMF aligned such that they form a 45 degree angle with the principal axis of the integrated optic chip 22. The specific operation of the Lyot depolarizer 46 is described in Fiber Optic Rotation Sensors by R. Ulrich in Vol. 32 Springer Series in Optical Sciences, P. 52, and J. of Lightwave Technology, by William K. Burns, Vol. Lt-1, No. 3, (September 1983).

The lengths of the optical fiber sections for the decorrelator 17 and depolarizer 46 are chosen by the same process. The first step in the process is to characterize the coherence spectrum of the light source. This can be done with a scanning interferometric optical spectrum analyzer such as the Advantest TQ8345 or by taking the Fourier transform of the optical spectrum. The coherence length is then determined by measuring the distance corresponding to the full width, half maximum (FWHM) of the central coherence region. Also, the position of the subsidiary coherence regions must be measured. The section lengths must then conform to the following criteria $$\frac{(n+1)\omega\Lambda}{\lambda} - \frac{5L_c\Lambda}{\lambda} > L > \frac{n\omega\Lambda}{\lambda} + \frac{5L_c\Lambda}{\lambda}$$

where n = the periodic order number of a given coherence region-the central region is order 0
ω = the distance between the periodic coherence regions
Λ = the beat length of the fiber used
λ = centroid wavelength of the light source
L = length of the fiber section This will ensure that the fiber sections are not only of sufficient length to decorrelate the light in the orthogonal polarization states, but that a fiber length is not chosen such that an inadvertent recorrelation occurs due to the fiber length corresponding to one of the subsidiary correlation regions.

Located between the parallel runs of waveguide 27 and waveguide 29 on chip 22 are a pair of waveguides which are part of an optical circuit which comprises a Mach-Zehnder interferometer 48. The two imbedded waveguides, 33 and 53, respectively, form the opposite legs of the Mach-Zehnder interferometer 48. Optical waveguide 33 extends from beam dump 35 and then in close juxtaposition with waveguide 27, with which it is in parallel, forms imbedded coupler 34 and then extends on between two spaced and parallel metalized pads similar to pads 31 and 32 described above, and between which it runs spaced equidistant to form the phase modulator 72. The waveguide 33 then continues on to form one side of the imbedded coupler 76 before terminating at the end of the chip 22 in the dead end 80. Similarly, waveguide 53 extends through the surface of chip 22 from beam dump 55 and then in close juxtaposition with waveguide 29, with which it is in parallel, forms imbedded coupler 54 and then extends on between two spaced and parallel metalized pads, between which it runs in parallel, through the surface of chip 22, to form the phase modulator 68. The waveguide 53 continues on from phase modulator 68 until it is in parallel juxtaposition with waveguide 33 to form the coupler 76. Waveguide 53 then continues to the end of the chip 22 where it is optically connected by means of optical fiber waveguide segment 82 with the photodiode 84. Thus, the Mach-Zehnder interferometer 48 on the surface of the chip 22 consists of the couplers 34, 54, and 76, and two phase modulators, 68 and 72. Also, dead end 80 can be connected to a photodiode similar to 84, and the two can be used in conjunction for common mode noise rejection. Beam dumps 35 and 55 are formed by angling the short waveguide segments sharply and metalizing over the short waveguide segments.

Figure 6:
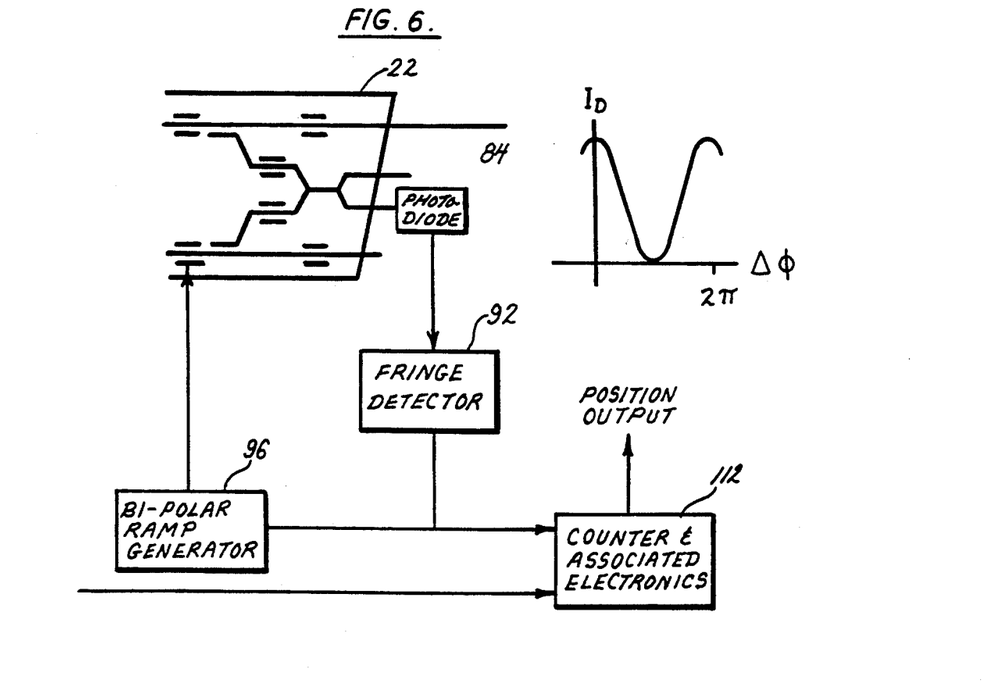
FIG. 6 is a schematic representation of the portion of the optic chip of the present invention employed as a fringe detector.

The external electrical circuitry of the subject invention, as shown in FIG. 3, consists of the photodiode 108 which receives light returning from coil 42 and communicated from the coupler 18, and which is connected in series with the synchronous demodulator 104 which in turn is connected in series with first integrator 100. The first integrator 100 is connected to the second integrator which serves as the bipolar ramp generator 96 which is in turn connected in series with the phase modulator 60 on chip 22. Integrator 100 provides ramp polarity information to the electronics associated with counter 112. The squarewave generator 52 is connected in parallel to the synchronous demodulator 104 in the external circuit and the phase modulator 50 on the chip 22. Finally, the photodiode 84, which is optically linked to the chip 22 by the optical fiber waveguide segment 82, is electrically connected to the fringe detector 92 shown in FIG. 6, which in turn is connected in parallel with the bipolar ramp generator 96, to which it supplies a reset command, and to the counter 112, which provides the position output information for the interferometric gyroscope of the present invention. The output level of integrator 100 is the rate output of the IFOG of the present invention.

In a preferred embodiment of the present invention the chip is fabricated from lithium-niobate substrate material 66 mm long by 1 square millimeter cross-section.

The chip 22 has imbedded polarizing waveguides produced by the annealed proton exchange (APE) process. The process produces polarizing waveguides, e.g. 27, 29, 33, and 53 having extinction ratios of over 70 decibels. Two imbedded waveguides are simply brought close together to form couplers on the chip. Phase modulators are formed by metalizing planar, rectangular-shaped pads on the chip surface parallel to and in juxtaposition with and extending equidistant from and on opposite sides of an imbedded waveguide. The synchronous demodulator 104, in the control loop for nulling the gyro, produces a dc voltage proportional to rate. This dc voltage is integrated by integrator 100 and from this output the ramps are produced by the ramp generator 96. The ramp waveform applied to the phase modulator 60 comprises the Serrodyne frequency shifter mentioned earlier since $\Delta\omega = d\phi/dt$. Since this frequency shift of the light entering and exiting the coil occurs one loop transit time τ apart (due to the Serrodyne phase modulator being on one side of the coil), net phase is induced into the gyro equal to $\Delta\omega\tau$. This $\Delta\omega\tau$, electronically induced phase, is maintained by the control loop to perfectly cancel the Sagnac phase, thus linearizing the scale factor of the gyro. The function of the first integrator 100 is to provide a high dc gain to minimize the steady state error voltage according to standard control practices. When the ramp from ramp generator 96 resets, a phase spike is produced. Another spike is produced τ (loop transit time) later due to light entering the loop at the time the ramp resets. In the prior art, some have postulated that this situation will result in an averaged error. This is not the case. If the gyro is modulated at the synchronous frequency, which is $$\frac{1}{2\tau},$$

the spike pairs are averaged to zero via the synchronous demodulator 104. Synchronous demodulators are not sensitive to even harmonics and the spike pair frequency is equal to $$\frac{1}{\tau}.$$

The rate output of the control loop is an order of magnitude less wavelength change sensitive as compared to the position output of the gyro. For low accuracy applications requiring a rate sensor, the rate output of the present invention can be used without having to perform scale factor wavelength correction.

It can be shown that the rate output scale factor, $S_R$ is wavelength sensitive via the extraordinary index of refraction $n_e$, of the integrated optical waveguide comprising the Serrodyne phase modulator 60 according to $$\left|\frac{dS_R}{S_R}\right| = \frac{3}{n_e} \frac{\delta n_e}{\delta \lambda} d\lambda$$

where
$S_R$ = rate output scale factor
$\lambda$ = centroid wavelength of the light source
$n_e$ = extraordinary index of refraction
A typical number for the wave length dependency of $n_e$ is $$\frac{\delta n_e}{\delta \lambda} = 0.036/\mu m |_{\lambda = 1300 \, nm}$$

Therefore the fractional wavelength change in $S_R$ is approximately $5 \times 10^{-5} \, d\lambda$ where $d\lambda$ is in nm. This is in contrast to the position output scale factor $S_p$ which is a direct function of wavelength given by $$\left|\frac{dS_p}{S_p}\right| = \frac{d\lambda}{\lambda}$$

which yields an approximate fractional wavelength change in $S_p$ of $$7.7 \times 10^{-4} d\lambda |_{\lambda = 1300 \, nm}$$

where $d\lambda$ is again in nm.

Figure 7:
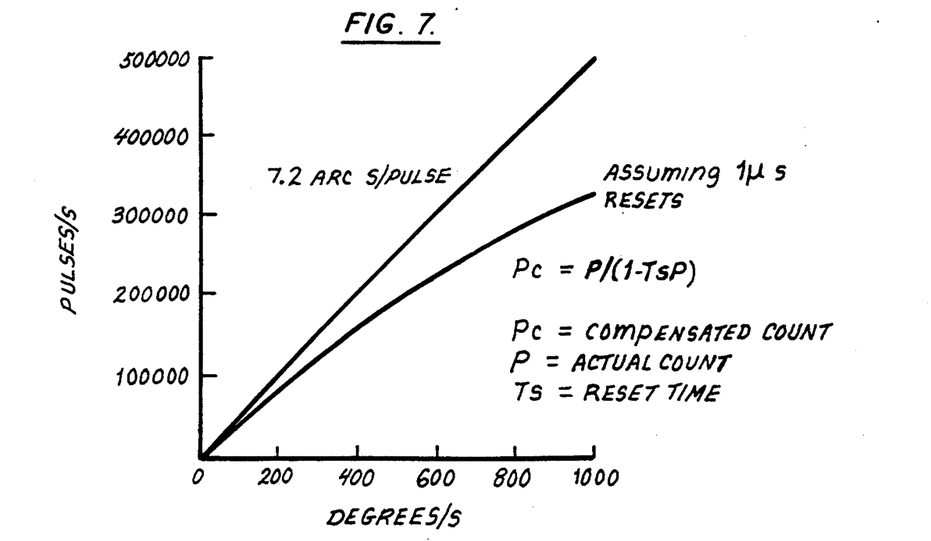
FIG. 7 is a graph of actual scale factor of the gyroscope of the present invention with the idealized linear scale factor sought.

A comparison of the actual scale factor of the preferred embodiment of the present invention with the idealized linear scale factor sought is shown in FIG. 7.

The reason that the scale factor is not linear is because the Serrodyne ramps do not reset instantaneously but have a finite reset time. To understand this, the positional output is essentially a count of the ramp resets. Then for a given rotation rate input, the number of resets counted with a non-ideal ramp generator would be less than the resets counted if an ideal, zero reset time, ramp generator were employed. This non-linearity can be corrected by the model equation $$P_C = \frac{P}{(1 - T_S P)}$$

where
Pc = compensated or linearized count
P = actual count
Ts = Serrodyne ramp reset time

OPERATION

With reference to FIG. 3, the edge light emitting diode (ELED) 14, the light source for the gyroscope of the present invention, produces broad spectrum, nearly depolarized light roughly centered at 1.3µ wavelength. This light is communicated through fiber optic waveguide segment 16 to the optical coupler 18. Half of the light entering the coupler 18 continues through a first waveguide of the coupler and the connecting fiber optic waveguide segment 17 to the integrated optic chip 22. At this juncture, the orthogonal polarization states entering the chip display a high degree of decorrelation. The other half of the light entering the coupler 18 crosses over internally to the second waveguide of the coupler and is terminated at the dead end 21.

The half of the light reaching the integrated optic chip 22 from the light source 14 is further attenuated by half due to the polarizing waveguides of the chip and is additionally split into two parts by integrated optic coupler 26. Half of the light entering the coupler 26 then exits to the waveguide 27 while the other half which has crossed over within the coupler 26 exits to the waveguide 29.

Prior to any gyro motion the light in waveguide 27 exits the chip 22 into fiber optic waveguide segment 28 and then into coil 42. This light leaves coil 42 via the Lyot depolarizer 46, and is depolarized prior to entering the chip. The light exiting the Lyot depolarizer 46 reenters the chip 22. Half of that light is lost due to the polarizing waveguides. The remaining half is modulated by a signal from square wave generator 52 as it traverses through phase modulator 50. This modulated light wave traverses phase modulator 60 without receiving any further modulation, in the absence of gyro motion. It then enters the coupler 26.

The other half of the light which has crossed over within the coupler 26 and exits to the waveguide 29 enters the phase modulator 60 where, in the absence of gyro movement, no modulating ramp signal is introduced. The light continues from the phase modulator 60 to the phase modulator 50 where square wave modulation is introduced by the signal received from the square wave generator 52. The modulated light then traverses the Lyot depolarizer 46 and is consequently depolarized. The light then traverses the coil 42, the fiber optic waveguide segment 28, reenters the chip 22 via the waveguide 27, again losing half the intensity due to the polarizing waveguides, and enters the coupler 26 where it recombines with the light that went around the coil 42 in the opposite direction. One half of the light returning from the coil 42 and recombined in the coupler 26 crosses over in the coupler 26 to the dead end 64. The other half of the recombined light traverses the fiber optic waveguide segment 17 and then enters the coupler 18 where half is directed toward the edge light emitting diode 14 via the fiber optic waveguide segment 16, and the other half is directed to the photo diode 108 via the fiber optic waveguide segment 20. The signal out of the photo diode 108 is a dc level with zero square wave modulation (in the absence of rotation) which when input to the synchronous demodulator 104 produces zero output. The first integrator 100 output is zero indicating zero gyro rate, as is the output of the second integrator 96 labeled as the bipolar ramp generator in FIG. 3. With no ramp input from the second integrator 96 there is no modulation introduced to the phase modulator 60 on the chip 22 and, therefore, a constant output from the photodetector 84, no output from the fringe detector 92, and no change in the total count of the position output counter 112.

The above description represents the operation of the gyroscope of the present invention during its steady state condition corresponding to no gyroscope motion, and is somewhat idealized to better explain the concept.

To explain the operation of the gyro while in motion, assume the gyro is subjected to a step rotation vector. When the gyro experiences movement equal to or greater than the minimum resolution of the gyroscope, an output will result. With the gyroscope activated, light from the edge light emitting diode (ELED) 14 travels through the chip 22 to the coil 42, as described above for the steady state condition of operation. When motion occurs, the affect of the motion on the coil 42 causes a phase shift between the two beams of light traversing the coil in opposite directions. This phase shift is manifest in the modulation of the two halves of the input light waves being modulated by the signal from the square wave oscillator 52 in the phase modulator 50, one half being modulated before traversing the coil 42, and the other half after traversing the coil 42. The signals returning from the coil 42 are recombined by the coupler 26 on the chip 22 and one half of the recombined signal reaching coupler 18 which crosses over in coupler 18 to the photodetector 108 results in a detected signal bearing square wave modulation with amplitude proportional to the rotation rate sensed by the gyro. The synchronous demodulator 104 outputs a dc level proportional to the RMS value of the signal received from the photodiode 108. The first integrator 100 produces an increasing output in response to the input received from the synchronous demodulator 104. The increasing output of the first integrator 100 asymptotically approaches a dc output level proportional to the gyro rotation rate and causes the second integrator 96 to produce a ramp voltage output slope proportional to the rate experienced by the gyro. This output is fed to phase modulator 60 on chip 22 which simultaneously becomes the feedback to the gyro and input to the Mach-Zehnder interferometer 48. This produces two results. First, the amplitude of the square wave output of the photodiode 108 will begin decreasing, as will the output of the synchronous demodulator 104. The output of the first integrator 100 will begin stabilizing at some fixed level and the output of the ramp generator 96 will begin stabilizing at some fixed slope. As the gyro continues to turn, the ramp will eventually attain a total phase excursion such that it causes a complete optical fringe shift to occur at the output of the Mach-Zehnder interferometer 48. This event will be detected, via the photo diode 84, by the fringe detector 92. Once detected, the fringe detector 92 will issue a reset pulse to the ramp generator 96 to return it to zero output and a count pulse to the counter 112 to advance the count by one. The process then repeats as long as the gyro continues to rotate. The minimum resolution is then determined by the amount of fringe shift that the fringe detector is designed to detect. Detecting one complete fringe shift or integer multiples of one complete fringe shift make the electronics relatively simple. One complete fringe shift was chosen for the present invention. A plus or minus ramp polarity signal is sent from the first integrator 100 to the counter 112 to permit it to count up or down to correctly reflect direction of gyro rotation. As the gyro rotates, pulses will be passed to the counter 112 for each increment of arc rotated in either direction at a frequency dependent upon the rate of rotation.

It should be understood from the foregoing that the present invention can take form in various configurations. For example, the coupler 18 in FIG. 3 can be incorporated as an integral part of the integrated optic chip 22. Also, functional components in and on the chip 22 can be located in relation to each other for operating purposes, attainment and maintenance of desirable environmental characteristics, and purposes of enhancing manufacturing processes and operating efficiencies without exceeding the bounds of the present invention as defined and encompassed by the claims which follow.

What I now claim as my invention is:

1. An interferometric fiber optic gyroscope, comprising:
    a means for producing light at a pre-determined frequency;
    an optical decorrelator having an input and an output;
    a means for electro-optically processing and interferometrically sensing said light, said means having a first input connected to the output of said optical decorrelator, and a second and third input, and a plurality of outputs;
    a first means for communicating and coupling light from said means for producing light to the input of said optical decorrelator, said communicating and coupling means having an input connecting directly to a first output, connected to said optical correlator input, and optically coupling with a second output;
    a means for compensating for polarization fade, said means having two opposite ends, one of said ends affixed to one output of said processing means;
    a fiber optic coil having two ends, one of said ends affixed to one of the outputs of said means for electro-optically processing said light, the other of said ends affixed to the end of said compensating means not connected to said processing means;
    a means for self-adjusting serrodyne phase nulling the output of said gyroscope, said means connected between an output of said means for electro-optically processing said light and the coupled second output of said first means for communicating and coupling said light, and additionally connected to said second and third inputs so that the scale factor of said gyroscope is desensitized to age of gyro components, wavelength variations of said light producing means, and gyro temperature variations; and
    a means connected to said nulling means for providing position output information for said gyroscope.

2. The gyroscope of claim 1 wherein said means for producing light is a light emitting diode.

3. The gyroscope of claim 1 wherein said means for producing light is an edge light emitting diode.

4. The gyroscope of claim 1 wherein said means for producing light produces light at 1.3$\mu$ wavelength.

5. The gyroscope of claim 1 wherein said nulling means, comprises:
    a means for detecting the composite modulation of the light signal returning from said fiber optic coil, said means optically connected to the second output of said first means of communicating and coupling said light;
    a square wave oscillator having a plurality of outputs, and having one of said outputs electrically connected to said third input to said electro-optic processing means;
    a means, electrically connected to the output of said means for detecting and the output of said square wave oscillator, for synchronously demodulating the signal received from said detecting means;
    a means, connected to the output of said means for synchronous demodulation, for producing a gyro rate output signal in response to the input from said means for synchronous demodulation;
    a means, connected to one of said plurality of outputs from said electro-optic processing means, for detecting the signal output therefrom;

a means, connected to the output of detecting means connected to one of said plurality of outputs from said electro-optic processing and interferometric sensing means, for sampling the detected signal therefrom and producing a reset command signal; and a serrodyne means, connected to receive as inputs the gyro rate output from said first integrating means and the reset command signal from said means for sampling and producing a reset command signal, for producing a ramp signal as input to said second input to said electro-optic processing means and a ramp polarity signal to said means for directional counting.

6. The gyroscope of claim 5 wherein said means for detecting the composite modulation of the light signal is a photo detector.

7. The gyroscope of claim 5 wherein said means for producing a gyro rate output in response to the input from said means for synchronous demodulation is an integrator.

8. The gyroscope of claim 5 wherein said means for producing a ramp signal as input to said second input to said electro-optic processing means and a ramp polarity signal to said means for bidirectional counting is a bipolar ramp generator.

9. The gyroscope of claim 8 wherein said bipolar ramp generator is an integrator.

10. The gyroscope of claim 5 wherein said means for producing position output information is a bidirectional counter.

11. The gyroscope of claim 5 wherein said means for electro-optically processing and interferometrically sensing said light is an integrated optical circuit.

12. The gyroscope of claim 11 wherein said integrated optical circuit, comprises:
an optical substrate prepared to receive implanted and deposited optical circuitry;
a means disposed in said substrate and located at one end thereof for receiving input to said circuit and splitting said input into two equal amplitude light waves;
a means for communicating said two equal amplitude light waves through said circuit separately between said means for receiving and splitting said input and two of said plurality of outputs;
a means disposed in juxtaposition with said communicating means and connected thereto at said second and third inputs to said electro-optic processing means, for modulating said light waves; and
an interferometric means, disposed operationally in juxtaposition with said communicating means, for sensing the optical phase induced by said ramp voltage.

13. The gyroscope of claim 12 wherein said means for receiving and splitting the light input to said circuit is an integrated optical coupler.

14. The gyroscope of claim 12 wherein said means for communicating said light waves through said circuit is a parallel pair of integrated implanted optical waveguides.

15. The gyroscope of claim 12 wherein said means for modulating said light waves is a pair of integrated optical modulators disposed serially from each other along one of said optical waveguides connecting to said coil.

16. The gyroscope of claim 15 wherein each of said optical modulators, comprises:
a pair of parallel metalized pads; and
a portion of said one optical waveguide disposed and spaced equidistant from and between each of said pads.

17. The gyroscope of claim 12 wherein said interferometric means for sensing the optical phase induced by said ramp voltage is a Mach-Zehnder interferometer.

18. The gyroscope of claim 12 wherein said optical substrate is angle polished along the width dimension.

19. The gyroscope of claim 12 wherein said waveguides are polarizing.

20. The gyroscope of claim 12 wherein said waveguides are introduced into said optical substrate by the annealed proton exchange process.

21. The gyroscope of claim 12 wherein said waveguide interfaces are laterally displaced from each other in a planar surface-layer of said substrate by a distance greater than the light source coherence length for the light source used.

22. The gyroscope of claim 12 wherein said optical substrate is lithium niobate crystal.

23. The gyroscope of claim 1 wherein said means for compensating for polarization fade is a Lyot depolarizer.

24. The gyroscope of claim 1 wherein said fiber optic coil is fabricated with single mode optical fiber.

25. The gyroscope of claim 24 wherein said optical decorrelator is fabricated from bi-refringent optical fiber.

26. The gyroscope of claim 23 wherein said Lyot depolarizer is fabricated from bi-refringent optical fiber.

27. The method of employing standard signal mode fiber (SSMF) for the fiber optic coil, operating said gyroscope in a closed loop fashion, obtaining a digital readout, and obtaining an output whose scale factor is less sensitive to wavelength change.

a. introducing broadband light of sufficient intensity to yield the desired signal to noise ratio;
b. decorrelate and mode filter the orthogonal polarization states of said light and split said light into two approximately equal intensity beams;
c. bias phase modulate said mode filtered light to maximize scale factor or signal to noise and minimize noise due to backscatter;
d. communicate said bias phase modulated light and unmodulated light to said coil;
e. depolarize the light entering and leaving said coil;
f. mode filter, phase modulate, and recombine the light returning from said coil;
g. detect and produce a signal corresponding to rotation and rotational direction of said gyro from said recombined light;
h. demodulate said signal corresponding to rotation and direction;
i. produce an intermediate dc output signal proportional to gyro rate and less scale factor wavelength sensitive than the final positional output of said gyro from said signal corresponding to rotation and direction and produce a directional plus or minus signal;
j. produce a ramp-shaped phase modulating and nulling signal from said intermediate dc output signal;
k. apply said phase modulating nulling signal to null the rotation and rotation direction signal of the gyro;
l. interferometrically sense said phase modulating nulling signal and detect the resultant signal;
m. employ said detected signal to produce a signal to control the phase amplitude excursion of said nulling waveform and produce a pulse train indicative of the positional change of said gyroscope signal; and n. totalize said pulse train to obtain gyro position information in combination with said directional plus or minus signal for final positional output of said gyro.

* * * * *